United States Patent [19]

Asmus

[11] 4,450,568
[45] May 22, 1984

[54] PUMPING A PHOTOLYTIC LASER UTILIZING A PLASMA PINCH

[75] Inventor: John F. Asmus, La Jolla, Calif.

[73] Assignee: Maxwell Laboratories, Inc., San Diego, Calif.

[21] Appl. No.: 321,118

[22] Filed: Nov. 13, 1981

[51] Int. Cl.³ .............................................. H01S 3/09
[52] U.S. Cl. ...................................... 372/76; 372/37; 372/71
[58] Field of Search ...................... 372/76, 69, 70, 71, 372/37

[56] References Cited

U.S. PATENT DOCUMENTS

| | | | |
|---|---|---|---|
| 4,041,414 | 8/1977 | Richardson et al. | 331/94.5 |
| 4,053,783 | 10/1977 | Scully | 250/493 |
| 4,075,579 | 2/1978 | Hunter, Jr. et al. | 331/94.5 |
| 4,077,017 | 2/1978 | Gilson et al. | 331/94.5 |
| 4,087,763 | 5/1978 | George et al. | 331/94.5 |
| 4,105,952 | 8/1978 | Tulip | 331/94.5 |
| 4,114,113 | 9/1978 | Hasson et al. | 331/94.5 |
| 4,121,176 | 10/1978 | Golden et al. | 331/94.5 |
| 4,143,336 | 3/1979 | Searles et al. | 331/94.5 |
| 4,168,475 | 9/1979 | Schimitischek et al. | 331/94.5 |
| 4,196,401 | 4/1980 | Avidor et al. | 331/94.5 |
| 4,203,079 | 5/1980 | Daugherty et al. | 331/94.5 |
| 4,369,514 | 1/1983 | Silfvast et al. | 372/76 |
| 4,390,992 | 6/1983 | Judd | 372/70 |

Primary Examiner—James W. Davie
Attorney, Agent, or Firm—Fitch, Even, Tabin & Flannery

[57] ABSTRACT

A preconditioning beam is used to excite gas particles preferentially along a channel between two electrodes in a laser chamber. The preconditioning beam may be an electron beam or a laser beam. An electrical discharge between the electrodes is conducted along the channel by the excited gas particles to form a gas embedded plasma pinch. Depending on the profile of the discharge, the pinch may be stable or collapsing. The pinch emits vacuum ultraviolet radiation which photodissociates molecules of the photolytic laser medium confined by the chamber. The dissociation creates a population inversion, initiating lasing activity. A resonator system reflects the developing laser pulse back and forth through the chamber to stimulate further emissions and facilitate pulse amplification. The developed pulse is transmitted by appropriate means.

21 Claims, 3 Drawing Figures

U.S. Patent   May 22, 1984   4,450,568
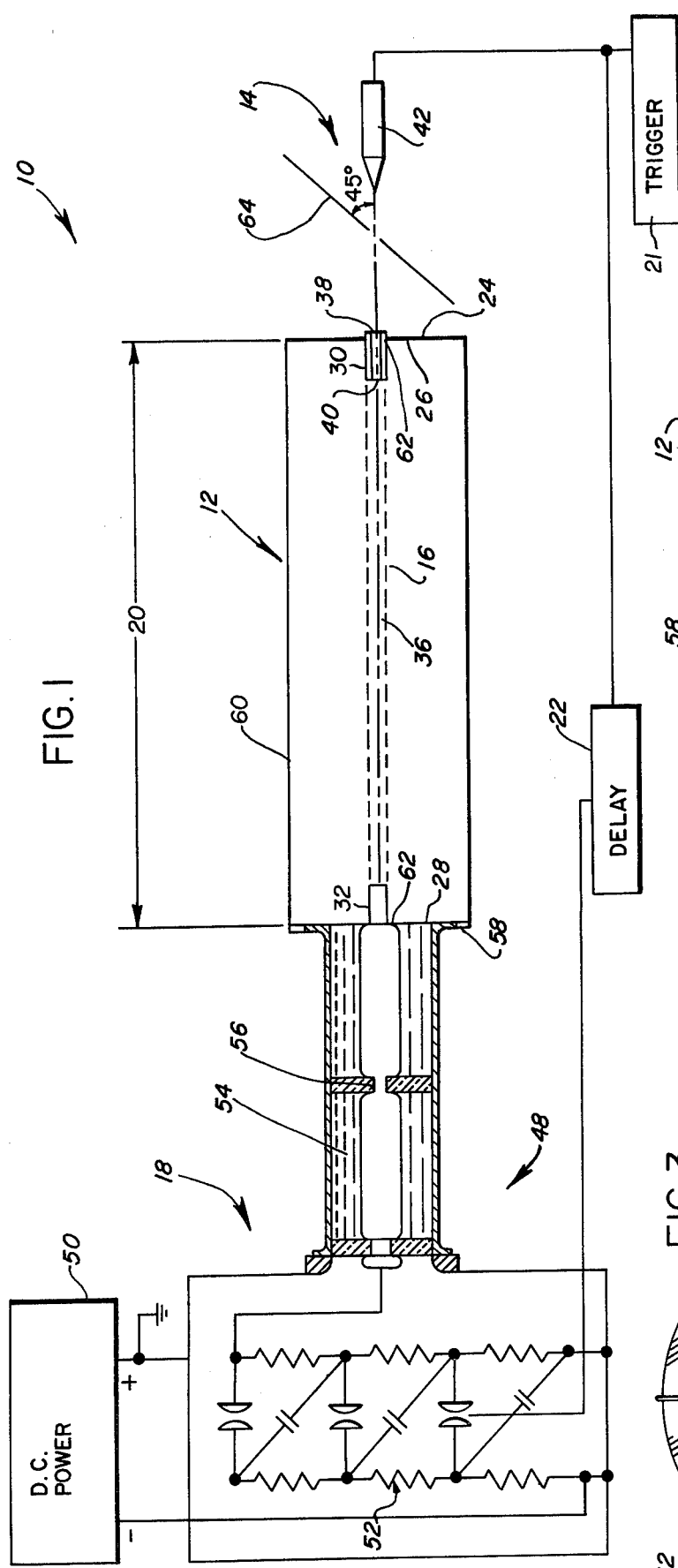
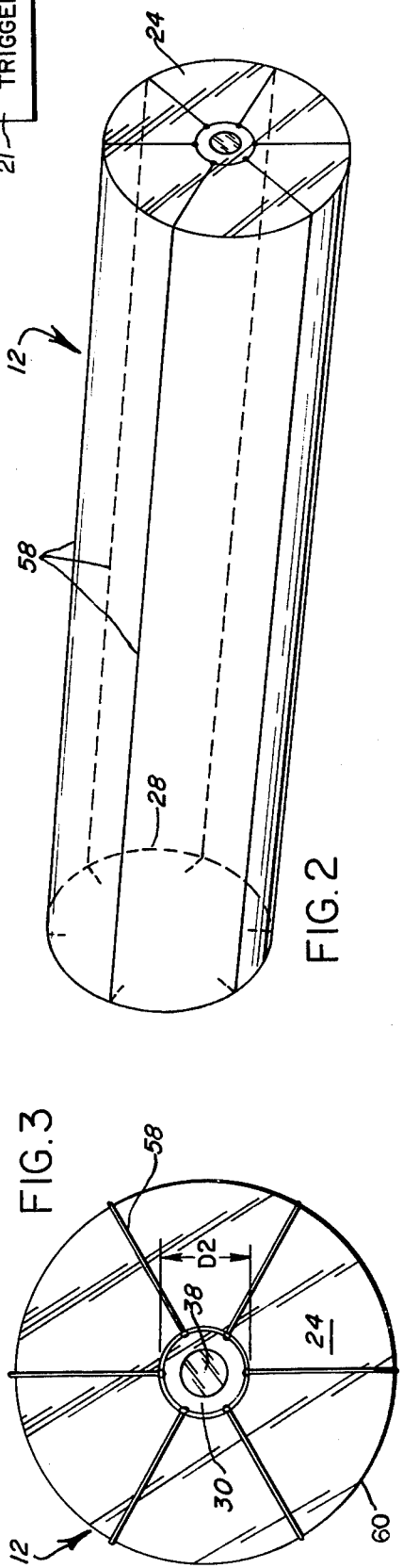

4,450,568

PUMPING A PHOTOLYTIC LASER UTILIZING A PLASMA PINCH

BACKGROUND OF THE INVENTION

The present invention relates to lasers and, more particularly, to a method and apparatus for pumping a photolytic laser with a plasma pinch.

"Laser" is an acronym for light amplification by the stimulated emission of radiation. In a laser, atoms, molecules, ions or crystals in excited states may be induced to emit radiation when stimulated by light of appropriate frequency. In a photolytic laser, intense beams of light dissociate molecules so as to establish a population inversion with respect to at least one photolysis product and initiate and sustain lasing activity. The process of creating excited states in the laser medium is termed "pumping".

One challenge in designing a photolytic laser is to provide effective pumping of the lasing medium. In other words, an efficiently generated intense pulse of radiation must impinge upon the particles of the photolytic lasing medium. Vacuum ultraviolet radiation provides one of the more useful wavelength ranges for laser pumping. However, due to the unavailability of suitable materials for transmitting vacuum ultraviolet radiation, it has proved difficult, if not impossible, to pump a laser by generating vacuum ultraviolet radiation outside a laser chamber and directing it into the chamber through a window.

It is known to generate vacuum ultraviolet radiation within the lasing chamber so that a window is not required. Hunter, Jr., U.S. Pat. No. 4,075,579 discloses an apparatus and method for the pumping of a laser by generating vacuum ultraviolet radiation throughout a lasing chamber. Noble gas atoms, excited by an electron beam, emit vacuum ultraviolet radiation to pump a photolytic lasing medium. There are at least two disadvantages to this approach. The first is the bulk of the electron beam generating apparatus. The second arises from the uniform excitation of the noble gas throughout the laser chamber. The uniform excitation results in excited noble gas atoms being in close proximity to the particles of the lasing medium and in particular to the excited photolysis products that are to support lasing activity. The excited noble gas molecules deactivate a percentage of the excited photolysis products through collisions quenching the population inversion without contributing to lasing activity.

It is also known to provide a more localized source of ultraviolet radiation by exploding wires. In this approach a large electric current explodes a wire extending across a laser chamber. A plasma, established by the explosion and located along the path defined by the wire, emits copious vacuum ultraviolet radiation which is used to pump a photolytic laser medium. The disadvantages of the exploding wire approach include: irregular vacuum ultraviolet emissions due to the uneven breakup of the wire, contamination of the chamber due to impurities in the wire, and the difficulty of replacing the wire rapidly enough for high repetition rate operation of the laser.

It is an object of the present invention to provide an improved apparatus and an improved method for the efficient pumping of a photolytic laser.

SUMMARY OF THE INVENTION

In accordance with the present invention a gas embedded pinch is used to pump a photolytic lasing medium. An embedded pinch laser (EPL) comprises a chamber, a gas including a photolytic lasing medium confined by the chamber, a transmitting means for allowing a developed pulse to exit the chamber, a resonator system, an electrical discharge system, a preconditioning system, and a time delay means for coordinating the activation of the preconditioning and discharge systems. The method of the present invention involves: establishing a preconditioned channel within a confined volume of gas including a photolytic lasing medium by exciting gas particles within the channel by means of an electron beam or a relatively weak laser beam; passing electric current along the preconditioned channel so as to establish, maintain and, in one preferred embodiment, collapse a plasma pinch along the channel; utilizing the vacuum ultraviolet radiation thereupon produced by the pinch to photodissociate molecules of the lasing medium, creating a population inversion of at least one photolysis product in an upper laser state; reflecting radiation emitted as excited particles drop from the upper laser state to a lower laser or ground state, such reflection being back and forth through the gas so that resonance activity is facilitated; and transmitting the developed laser pulse.

A plasma pinch is so called because the magnetic forces generated by the electric current through the plasxa channel serve to pinch or compress the plasma toward its axis. The magnitude of the pinch effect is dependent upon the magnitude of the current creating the pinch. It is possible to select the current so as to form a stable pinch in which the thermal expansion of the plasma particles is generally offset by the pinch effect so that the channel diameter remains substantially constant. A much greater current will eventually collapse a pinch to a fine filament. The stable and collapsing pinches define alternative embodiments of the present invention.

Radiation is emitted relatively uniformly throughout the duration of a stable pinch, whereas, in the case of the collapsing pinch, most of the radiation occurs upon collapse of the pinch. An advantage of the collapsing pinch is that it compresses the electrical energy input into a pulse of relatively short duration. Because of this pulse compression, drive rise time requirements on the electrical system are relaxed. On the other hand, an advantage of the stable pinch is that it does not generate shock waves by sudden transformation of shape.

One of the problems in dealing with pinches is their tendency to self-destruct by forming kinks and other instabilities. This problem is especially acute where the pinch is in a low pressure environment. In accordance with the present invention, the pinch is embedded in a gas under sufficient pressure to ameliorate the tendency of the plasma to destabilize. Where it is not possible to supply this pressure by the lasing medium alone (too dense a lasing medium may impede lasing activity), a buffer gas may be added to make up the pressure differential. Since the pinch is localized, there is little tendency for excited buffer particles to interfere with laser activity.

There are several advantages to the EPL and pumping method presented herein. Repeated pulse operation is greatly facilitated in comparison to the exploding wire approach, for no solid components need to be replaced between firings. The plasma pinch is also relatively contamination free.

Generally, the plasma pinch provides a highly efficient means of converting electrical energy into vacuum ultraviolet radiation. There are no pumping radiation losses due to an intervening window, for the pinch is localized within the lasing chamber. Also, since the pinch is localized, there is less tendency for the pumping or exciter particles to deactivate the lasing medium. Where a collapsing pinch is used, drive rise time requirements on the electrical discharge system are relaxed and an especially intense vacuum ultraviolet pulse is provided. Finally, the laser is capable of cyclical operation provided a self-restoring laser medium is selected "Self-restoring", as used herein, refers to a laser medium which essentially returns to its original composition within a short time subsequent to the termination of lasing activity.

BRIEF DESCRIPTION OF THE DRAWINGS

FIG. 1 is a sectional view, partly diagrammatic, of a laser in accordance with the present invention.

FIG. 2 is a perspective view of a laser chamber in accordance with the present invention.

FIG. 3 is a front elevational view of the laser chamber of FIG. 2.

DESCRIPTION OF THE PREFERRED EMBODIMENTS

A preferred method and preferred apparatus utilizing a gas embedded pinch to pump a photolytic laser 10 are presented. The lasing activity takes place within a chamber 12 containing a gas, one component of which is a photolytic laser medium. The embedded pinch laser (EPL) 10 includes: a preconditioning system 14 for establishing a channel 16 for a pinch by exciting gas within a limited volume of the chamber 12; a discharge system 18 for ionizing the gas within the preconditioned channel 16 so as to form a plasma pinch; and a resonator system 20 for reflecting laser radiation within the chamber 12 while laser amplification progresses. The EPL 10 also includes: trigger means 21 for actuating the preconditioning system; time delay means 22 for coordinating the firings of the preconditioning and discharge systems 14 and 18; and transmitting means 24, generally associated with the resonator system 20, for allowing a developed laser pulse to exit the laser chamber 12. The chamber 12, the gas and the associated systems are described generally before a more detailed description of the EPL is presented.

The preferred EPL 10 has a cylindrical chamber 12 with front and rear mirrors 26 and 28 at the corresponding ends of the cylinder. (Front refers to the end of the chamber 12 through which the developed laser pulse exits.) Through each mirror 26, 28 extends a respective discharge electrode 30, 32 aligned with the chamber axis 36. A window 38 for a preconditioning beam is disposed over a hole 40 in the front discharge electrode 30. The functioning of these chamber components is discussed below in connection with the associated preconditioning, discharge and resonator systems.

The gas within the chamber 12 includes a photolytic lasing medium. A photolytic lasing medium is composed of molecules which, upon dissociation by vacuum ultraviolet radiation, provide at least one photolysis product in an excited or upper laser state capable of initiating or maintaining lasing activity. The partial pressure of the lasing medium is selected to optimize lasing activity by balancing opposing considerations: too sparse a lasing medium cannot store enough energy to develop an intense laser pulse, while too dense a lasing medium quenches itself through deactivating collisions.

While the particular lasing medium selected determines the optimal partial pressure, it is generally below that necessary to stabilize a plasma pinch sufficiently to practice the present invention. Accordingly, the total gas pressure within the chamber 12 is increased by adding a buffer gas, which usually provides the preponderance of pressure within the chamber 12. Where there is a preponderance of buffer gas, it also is the primary contributor to the plasma pinch used to pump the laser, and thus may function as a pumping medium.

The preconditioning system 14 includes a preconditioning beam generator 42, trigger means 21 for actuating the beam generator 42, and at least in some embodiments, the preconditioning beam window 38. The preconditioning beam generator 42 may be a weak laser or an electron beam generator. In either case, the operation of the preferred EPL 10 begins with a preconditioning beam being transmitted through the preconditioning beam window 38 of appropriate material and along the chamber axis 36. The preconditioning beam excites gas particles in the vicinity of the chamber axis 36, thus defining the preconditioned channel within which the plasma pinch is then formed.

Connected to the preconditioning system 14 via the time delay means 22 to coordinate its actuation is the discharge system 18 for generating an intense electrical pulse along the preconditioned channel 16 to establish a plasm pinch. The discharge system 18 includes the electrodes 30 and 32 and discharge means for electrically discharging between the electrodes. The discharge means may include a capacitor bank 48 for delivering current between the electrodes, a power supply means 50 for charging the capacitor bank 48, and connecting circuitry. The capacitor bank 48 of the preferred embodiments comprises a high-voltage driver 52 (such as a Marx generator, capacitor bank, or pulse transformer) connected to the rear electrode 32 via a water line 54 and a peaking switch 56 which switch may be of the sort described in the aforesaid U.S. Pat. No. 4,075,579. The water line 54 and peaking switch 56 serve to compress the electrical pulse delivered by the high-voltage driver 52 so that the drive rise time characteristics of the discharge system 18 are enhanced. The specifics of the capacitor design depend in part on whether a stable pinch or a collapsing pinch is selected. Preferably, the connecting circuitry includes a group of wires 58 extending adjacent to the outside surface of the chamber shell 60 and connecting the front electrode 30 to the high-voltage driver 52; the wires 58 are symmetrically disposed about the chamber axis 36 so that magnetic fields generated by currents within the wires 58 distort the plasma pinch minimally.

After being activated, the high-voltage driver 52 of the preferred embodiment dumps its charge into the water line 54, which serves as a short term high capacity capacitor. As the high-voltage driver 52 completes its discharge the peaking switch 56 is closed, discharging the electrical energy stored in the water line 54 between the electrodes 30 and 32. The effect of the water line stage is to deliver the charge originally stored in the high-voltage driver 52 to the electrodes 30 and 32 over a briefer duration than would be possible with a direct discharge from the high-voltage driver 52; thus the water line 54 serves to improve the electrical drive rise time characteristics of the discharge system 18.

The discharge between the electrodes is confined to the preconditioned channel 16 inasmuch as it is composed of excited gas particles and is thus conductive relative to the unexcited particles surrounding the channel 16. The current ionizes particles within the channel 16, establishing a plasma and creating a circumferential magnetic field; the magnetic field interacts with the current creating a centripetal force on the plasma tending to constrict or pinch the plasma toward the chamber axis 36.

In the stable pinch embodiment the voltage is tapered after the pinch is established so that the pinch effect generally offsets the thermal expansion of the pinch. In this case of the stable pinch, vacuum ultraviolet radiation is emitted substantially uniformly over the duration of the pinch. Since the volume occupied by the pinch is relatively constant, there is little tendency for shock waves to emanate and possibly disrupt lasing activity.

In the collapsing pinch embodiment, the discharge voltage is maintained at a high level so that the interaction of the magnetic field and the current eventually collapses the pinch to a fine filament on the chamber axis. While vacuum ultraviolet radiation is emitted during the entire lifetime of the pinch, the bulk of the radiation occurs upon collapse. Practically speaking, the optical pumping pulse is thereby made considerably shorter than the discharge by about an order of magnitude. Thus when a collapsing pinch is used, the drive rise time requirements on the discharge system 18 are considerably relaxed relative to a stable pinch embodiment providing the same pumping intensity.

In either embodiment the pressure of the unexcited gas surrounding the pinch helps to prevent kinks and other instabilities which might otherwise impair it. Thus a gas embedded pinch provides a relatively durable source of vacuum ultraviolet radiation. Furthermore, the pinch is a relatively efficient vehicle for converting electrical energy to vacuum ultraviolet radiation.

The vacuum ultraviolet radiation released by the pinch radiates throughout the chamber 12 photodissociating molecules of the lasing medium so as to establish a population inversion with respect to at least one photolysis product. The population inversion, in which there are more atoms in a higher energy level than in a lower energy level, is a condition precedent for emissions stimulated by atomic resonant response. Initially, radiation at the laser frequency results from spontaneous transitions to a lower ground state. The resulting radiation then stimulates further transitions in and emissions from other photolytic atoms, effectively amplifying the radiation at the laser frequency.

The illustrated laser 10 includes a laser pulse deflection mirror 64 for deflecting the developed laser pulse 90° so that the preconditioning beam generator 42 is not in the laser pulse path. The deflection mirror is of a material which reflects the laser frequency and transmits the preconditioning beam. Alternatively, the deflection mirror may include a hole or a window to permit the preconditioning beam to pass therethrough.

The resonator system 20 facilitates amplification by reflecting the laser radiation back and forth through the chamber 12 so that it continues to stimulate emissions. The resonator system 20 includes front and rear plane mirrors 26 and 28. The mirrors 26 and 28 have holes 62 for receiving the electrodes 30 and 32 therethrough. The rear mirror 28 is nominally 100% reflective; the front mirror 26 is partially reflective and partially transmitting so that it may serve as a transmitting means 24 allowing the developed laser pulse to exit the chamber 12 as the amplification process is completed.

Describing the illustrated EPL 10 in greater detail, the chamber 12 has a quartz shell 60 40 cm long and 51 mm in diameter. Other materials are possible, although it is preferable that a transparent material such as quartz or glass be employed so that the laser activity can be studied more readily.

The front and rear mirrors 26 and 28 of the resonator system 20 are plane circular mirrors 50.8 mm in diameter with central holes 62 10 mm in diameter for accommodating the discharge electrodes 30 to 32. The laser gain length is preferably at least 25 cm, while currently available equipment practically limits the pinch discharge length to about 50 cm. Accordingly, the mirrors 30 and 32 of the illustrated EPL 10 are 40 cm apart at the ends of the chamber 12. The mirrors 26 and 28 are parallel to one another and perpendicular to and concentric with the chamber axis 36.

The discharge system 18 of the illustrated embodiment comprises the power supply 50 the capacitor bank 48, including the high-voltage driver 52, or voltage multiplier, the water line 54, the peaking switch 56, the rear and front discharge electrodes 30 and 32, and return wires 58 from the front electrode 30 to the high-voltage driver 52. Each electrode 30, 32 is 10 mm in diameter and extends through its respective mirror 26, 28 and 5 cm toward the chamber center. As the mirrors 26 and 28 are 40 cm apart, the discharge length is 30 cm. The front electrode 26 has the window covered axial hole 40, which is 6 mm in diameter, for permitting a preconditioning beam to pass therethrough.

In the case of the collapsing pinch embodiment, the discharge system 18 is capable of delivering 40 ka at 320 kv for 10 ns along the 30 cm preconditioned channel 16 between the electrodes. In the case of the stable pinch embodiment the pinch is initiated as above and is maintained with a 40 ka current at 10 kv.

In either case, it is preferable that the discharge system 18 be capable of delivering the charge stored in the capacitor bank 48 to the electrodes 30 and 32 over as brief a duration as possible. To this end the illustrated embodiment interposes the water line 54 between the high-voltage driver and the rear electrode 32. Water has a very high dielectric constant and permits storing large amounts of charge and delivering the charge in a shorter time than is possible with a high-voltage driver such as a Marx generator. Since water becomes conducting through electrolysis, the water line cannot be used to store charge for more than brief durations. Accordingly, in the illustrated embodiment, the high-voltage driver 52 is used to store charge until discharge is desired. When the high-voltage driver 52 is activated, the charge is collected in the water line 54. When the charge in the water line 54 is maximized, the peaking switch 56 is closed, discharging the water line 54 between the electrodes 30 and 32, thereby providing an intense compressed electrical pulse to form and maintain the plasma pinch.

Time and electromagnetic fields are considerations in the discharge system 18. The speed of current through a wire is a limiting factor in a system operating on a time scale measured in nanoseconds. Accordingly, it is desirable that the circuit links and, in particular, the wires 58 from the front electrode 30 to the capacitor bank 48 be as short as possible without adversely affecting laser performance. However, the current through the return wires 58 generates a magnetic field that interacts with the pinch. In the preferred embodiments six return wires 58 extend adjacent the outside surfaces of the chamber shell 60 and symmetrically about the chamber axis 36. This ensures that the magnetic forces produced by the currents in the wires 58 substantailly cancel one another and that the uncancelled forces retain the symmetry of the pinch.

The preconditioning system 14 includes the beam generator 42, trigger means 21 and the window 38 through which a beam enters the chamber 12. In the preferred embodiment, a laser, such as a ruby laser, is employed to generate a beam and direct it through the preconditioning window 38 which is of quartz. At the point of focus, half way along the chamber axis 36, the beam is about 6 mm in diameter. It is found that reproducible channel initiation occurs for laser power much less than that required to produce actual breakdown in the gas.

In an alternative embodiment an electron beam generator and a titanium foil window are used. The electron beam is collimated to the desired discharge diameter of 5 mm and guided by an axial magnetic field of a few kilogauss applied to the gas volume by an external pulsed solenoid.

A third preconditioning approach involves forming one of the electrodes to be a good electron emitter (point, edge, etc.) so that the voltage applied along the chamber axis provides the electrons necessary to excite the molecules in the vicinity of the chamber axis. This approach obviates the need for a window in the preconditioning system.

A number of considerations must be balanced in arriving at a suitable gas composition for operation of the EPL 10. At minimum, the lasing medium must be sufficiently dense to support lasing activity, i.e. resonance and amplification at the laser frequency. Laser output is limited by the number of excited atoms of the dissociated lasing medium.

On the other hand, the contribution of a large population of excited atoms may be offset if these atoms can be quenched other than by emitting radiation, or if the radiation emitted is merely absorbed by various constituents of the gas. Thus, the laser medium must be sparse enough so that collisions among the particles and products of the photolytic lasing medium do not too severely deplete the population inversion.

However, the optimal partial pressure for most lasing mediums is too low to stabilize a pinch. Accordingly, a buffer gas is required for most photolytic media. The buffer gas is selected so as not to deactivate excited lasing atoms upon collision. An inert gas such as helium or argon is suitable. Argon is the preferred buffer gas since an argon based plasma, having a number of associated energy levels, emits a broad vacuum ultraviolet band well suited for photodissociation.

In one preferred embodiment, the gas is a mixture of 80 torr trifluoroidomethane, $CF_3I$, and 700 torr argon yielding a total pressure of slightly more than one atmosphere. The iodine compound serves as the photolytic lasing medium. This lasing medium is automatically restored shortly after the laser is fired, thus permitting pulsed operation of the laser. The argon serves to stabilize the pinch, and argon ions constitute the bulk of the plasma pinch. The argon has very little effect on the photolysis chemistry or the lasing action except what can be accounted for by simple collision broadening, namely, a broadening of the lasing transition, a reduction of the peak gain coefficient, and an increase in the stored energy capacity.

Presented by way of explanation, and not by way of limitation, is the following description of the chemistry of the preferred $CF_3I$ EPL. The photolysis reaction is simply $CF_3I + h2_{phot} \rightarrow I^* + CF_3$. This is followed by the lasing transition $I^*$ to $I + h2_{las}$. The photolysis is effective over a broad range in the far ultraviolet, centered near 260 to 270 nm, which is a bit too short for convenient pumping by inexpensive conventional flashlamps.

Following excitation of the $CF_3I$ molecule, dissociation is essentially instantaneous and occurs, presumably, in one vibrational period. Excitation at 270 nm supplies 4.6 eV which is more than the 2.5 eV required to dissociate the molecular bond of the lasing medium. Consequently, there is ample excess energy available to form $I^*$, which lies 0.95 eV above the I ground state. The energy surplus is converted to vibrations of the $CF_3$ radical. In fact, the quantum yield for producing $I^*$ by direct photolysis exceeds 90%. Therefore, rapid pumping is sufficient to ensure population inversion. In this context rapid means faster than the time required to deactivate $I^*$ to I. Spontaneous radiative decay of $I^*$ occurs with a lifetime of 130 ms which is far more than the lifetime of the pinch.

A more serious limitation on the time within which pumping must be completed is established by deactivating collisions. Since I is atomic, all nonradiative deactivation processes require collision with another partner. An efficient collision partner must normally be a molecule with low energy degrees of freedom. Consequently, inert gases, such as the preferred buffer gas argon, are ineffective. For He and Ar the cross section for collisional deactivation of $I^*$ is $2 \times 10^{-18}$ cm$^3$ sec$^{-1}$. This means that for the buffer pressures needed in the exemplary laser, deactivation would be only a few percent even after a millisecond. If it were necessary to add an electron scavenger like $SF_6$, this, too, would be a relatively weak quencher.

Accordingly, the population inversion persists at least up until times characteristic of collisions of the active species with itself or its photoproducts, independent of the presence of inert diluent. Such collisions determine the storage time for the population inversion. It should be noted that such collisions can contribute to the population inversion as well as to its quenching.

Among $I^*$ deactivation mechanisms, reaction with the radical $CF_3$ has the largest cross section. should be important at early times. However, other radical reactions are also very rapid. Recombination with ground state I to regenerate starting material removes $CF_3$ and also removes population from the lower state of the laser transition, thus increasing population inversion. The dominant process at early times before much ground state I has accumulated, however, is dimerization to perfluoroethane $C_2F_6$. Thus, after a very rapid induction period, $CF_3$ is gone while the $I^*$ population inversion remains.

At longer times, after the radical species are gone, deactivation of $I^*$ by collision with $CF_3$ and $C_2F_6$ controls the population inversion. Cross sections for these processes are typically $10^{-16}$ to $10^{-1}$ cm$^3$ sec$^{-1}$. $I_2$ is produced too slowly to be a significant deactivation factor except in sealed off systems. In summary, none of the deactivation processes deactivate the population of $I^*$ atoms so as to significantly impair the lasing process.

Alternative embodiments of the present invention incorporate other lasing media. Several iodine compounds other than the preferred trifluoroiodomethane, such as perfluoroisopropyl iodide, i-$C_3F_7I$ are used with comparable consideration. Other embodiments include an iron carbonyl laser, a thallium laser, a selenium laser, and a laser based on superfluorescence on the Na yellow line.

A further preferred embodiment of the present invention would be a laser utilizing a C-A transition in the XeF molecule. The pinch radiation is used to photodissociate $XeF_2$. The photolysis band for the C-A laser is located well into the vacuum ultraviolet and is very broad; consequently it is well matched to emission of the gas embedded discharge. The photolysis cross section is about 100 times larger than that of the iodine donors. Pressures used are about 40 times lower; so energy deposition is quite similar.

The C state is not populated directly upon dissociation, but is formed from a relaxation of the slightly higher B state by way of collision assisted processes. The C state lifetime is about 100 ns, which is well matched to the properties of the gas embedded discharge.

Many other embodiments are possible. Variations in the photolytic medium and in the buffer gas or gases are possible. A range of designs for the chamber, resonator system, discharge system and preconditioning system are anticipated. These and other modifications are possible without going beyond the spirit and scope of the present invention.

What is claimed is:

1. In a photolytic gas laser with a resonator chamber confining a gas that upon ionization in a plasma radiates in the vacuum ultraviolet, said gas including a laser medium, said laser medium being photodissociable by vacuum ultraviolet radiation to produce particles having an upper laser state whence they undergo spontaneous transition to a lower laser state by laser action, pumping apparatus comprising:
   a pair of spaced electrodes within said chamber;
   preconditioning means for preferentially exciting gas particles along an elongated channel within the chamber and between said electrodes;
   discharge means for passing electric current between said electrodes to form from preferentially excited gas particles within said channel a plasma pinch in the gas that radiates in the vacuum ultraviolet without substantial expansion of the plasma into the surrounding gas during such radiation.

2. The apparatus of claim 1 further characterized in that said means for preferentially exciting gas particles includes a laser.

3. The apparatus of claim 1 further characterized in that said means for preferentially exciting gas particles includes an electron beam generator.

4. The apparatus of claim 1, 2, or 3 further characterized in that said discharge means includes a high-voltage driver.

5. A photolytic laser comprising:
   a chamber;
   a gas that upon ionization in a plasma radiates in the vacuum ultraviolet, said gas including a molecular laser medium, said laser medium being photodissociable by vacuum ultraviolet radiation to produce particles having an upper laser state from which they undergo spontaneous transition to a lower laser state by laser action, said gas being confined by said chamber;
   a pair of spaced electrodes within said chamber;
   preconditioning means for preferentially exciting gas particles within an elongated channel between said electrodes and within said chamber;
   trigger means for actuating said preconditioning means;
   discharge means for applying a voltage between said spaced electrodes to form a plasma pinch from excited gas particles within said channel, the plasma pinch emitting vacuum ultraviolet radiation without substantial expansion of the plasma into the surroundng gas during such radiation, which radiation photodissociates molecules of the photolytic laser medium, establishing a population inversion and initiating lasing activity;
   time delay means for actuating said discharge means a predetermined time after said preconditioning means is actuated, said time delay means being associated with said trigger means;
   resonator means for sustaining lasing activity during pulse amplification by reflecting laser radiation back and forth through said chamber; and
   means for transmitting an amplified laser pulse from said chamber.

6. The photolytic laser of claim 5 further characterized in that said discharge means forms a stable pinch.

7. The photolytic laser of claim 5 further characterized in that said discharge means forms a collapsing pinch.

8. The photolytic laser of claim 5, 6 or 7 further characterized in that solid resonator means includes two mirrors, one of which has a nominal reflectivity of 100% and the other of which is partially transmitting.

9. The photolytic laser of claim 5, 6 or 7 further characterized in that said discharge means includes a high-voltage driver.

10. The photolytic laser of claim 5, 6 or 7 further characterized in that said discharge means includes a water line and a peaking switch.

11. A photolytic laser comprising:
    a cylindrical chamber having an axis, an outside surface and front and rear ends;
    a gaseous mixture confined by said chamber, said mixture including an inert gas and a molecular laser medium which is photodissociable by vacuum ultraviolet radiation to produce particles having an upper laser state from which they undergo transition to a lower laser state by laser action;
    a resonator system including circular plane front and rear mirrors disposed at the respective front and rear ends of said chamber and perpendicular to the axis of said chamber, each mirror having a central hole and being centered on the axis of said chamber, said rear mirror having a nominal reflectivity of 100% said front mirror being partially reflecting and partially transmitting to permit a developed laser pulse to exit said chamber;
    a discharge system including a power supply, a capacitor bank having a high-voltage driver and a water line, a peaking switch, front and rear electrodes, and return wires, said power supply being designed to charge said high-voltage driver, said water line being designed to temporarily store and compress the discharge of the high-voltage driver, said peaking switch being closable to discharge said water line between said electrodes, said electrodes being coaxial with said chamber and extending through the holes of the respective of said mirrors, said front electrode having a central hole for permitting a preconditioning beam to enter said chamber, said rear electrode being electrically connected to the water line via said peaking switch, and said front electrode being connected to said capacitor bank via return wires disposed symmetrically about said axis of said chamber and adjacent to the outside surface of said chamber;

a preconditioning system including a window disposed over said hole in said front electrode of said discharge system, beam means for generating a beam and directing it through said window and along the chamber axis to create a preconditioned channel of gas by exciting particles of the gaseous mixture in the vicinity of said axis of said chamber, and trigger means for actuating said preconditioning system; and time delay means for actuating said discharge system a predetermined time after said preconditioning system is actuated whereby, after said predetermined time after said preconditioning system is actuated to create a preconditioned channel within said chamber, said discharge system is actuated to discharge said high-voltage driver, which has been charged by said power supply, into said water line which temporarily stores and compresses the discharge before discharging across said electrodes upon the closing of said peaking switch to establish a plasma pinch along the preconditioned channel, the plasma pinch radiating vacuum ultraviolet radiation substantially throughout the chamber for dissociating molecules of said lasing medium and initiating lasing activity, said resonator system facilitating amplification of a laser pulse by reflecting laser emissions back and forth through said chamber to stimulate further emissions, the resulting developed laser pulse exiting said chamber through the said partially transmitting front mirror of said resonator system.

12. A photolytic laser comprising:

a cylindrical chamber having an axis, an outside surface and front and rear ends;

a gaseous mixture confined by said chamber, said mixture including an inert gas and a molecular laser medium which is photodissociable by vacuum ultraviolet radiation to produce particles having an upper laser state from which they undergo transition to a lower laser by laser action;

a preconditioning system including beam means for generating a beam and directing it along said axis of said chamber so as to create a preconditioned channel of excited gas particles along the axis of said chamber, the region defined by said channel being much less than that confined by said chamber, a window for permitting the preconditioning beam into said chamber, and trigger means for actuating said preconditioning system;

a discharge system including a high-voltage driver for storing electrical potential, a power supply for charging said high-voltage driver, a water line for temporarily storing electrical energy released from said high-voltage driver so as to compress the discharge, a peaking switch for discharging the electrical potential stored in the water line, and front and rear electrodes for creating an electrical discharge therebetween capable of forming a plasma pinch along a preconditioned channel of excited gas particles, said electrodes being respectively disposed adjacent said front and rear ends of said chamber and aligned with said axis of said chamber, said front electrode having an axial hole for permitting a preconditioning beam into said chamber, said front electrode being disposed at said window of said preconditioning system, said discharge system also including return wires from said front electrode to said high-voltage driver, said wires being disposed symmetrically about said axis of said chamber and adjacent to the outside surface of said chamber to minimize electromagnetic distortion of a plasma pinch along said axis of said chamber;

time delay means for actuating said discharge system a predetermined time after said preconditioning system is actuated so as to form a plasma pinch along a preconditioned channel created by said preconditioning system, the plasma pinch radiating vacuum ultraviolet radiation substantially throughout the chamber for photodissociating said lasing medium and initiating a laser pulse; and a resonator system for facilitating amplification of a laser pulse by reflecting laser emissions back and forth through said chamber, said resonator system including circular plane front and rear mirrors disposed at the respective front and rear ends of said chamber and perpendicular to the axis of said chamber, each mirror having a central hole so that a respective one of said electrodes extends therethrough, said rear mirror having a nominal reflectivity of 100%, and said front mirror being partially reflective and partially transmitting to permit a developed laser pulse to exit said chamber.

13. The photolytic laser of claim 11 or 12 further characterized in that said beam means of said preconditioning system is a laser and said window of said preconditioning system is of quartz.

14. The photolytic laser of claim 11 or 12 further characterized in that said beam means of said preconditioning system is an electron beam generator and the window of said preconditioning system is of metallic foil.

15. The photolytic laser of claim 11 or 12 further characterized in that said discharge system is capable of forming a stable plasma pinch along said preconditioned channel.

16. The photolytic laser of claim 11 or 12 further characterized in that said discharge system is capable of forming a collapsing plasma pinch along the preconditioned channel.

17. A method of pumping a photolytic laser with a chamber confining a gas that upon ionization in a plasma radiates in the vacuum ultraviolet, said gas including a photolytic laser medium, said laser medium being photodissociable by vacuum ultraviolet radiation to produce particles having an upper laser state whence they undergo spontaneous transition to a lower laser state by laser action, said method comprising:

exciting particles of the gas within an elongated channel within the chamber; and discharging electricity along the elongated channel to form a plasma pinch in the gas that radiates vacuum ultraviolet radiation through the gas in the chamber photodissociating the laser medium to initiate lasing activity, without substantial expansion of the plasma into the surrounding gas during such radiation.

18. A method of pumping a photolytic laser with a pair of spaced electrodes disposed within a chamber, said chamber confining a gas that upon ionization in a plasma radiates in the vacuum ultraviolet, said gas including a photolytic laser medium, said laser medium being photodissociable by vacuum ultraviolet radiation to produce particles having an upper laser state whence they undergo spontaneous transition to a lower laser state by laser action, said method comprising:

generating an electron beam and directing it along an elongated channel between the electrodes so as to excite gas particles within the chamber; and discharging electricity along the elongated channel so as to form a plasma pinch in the gas that radiates vacuum ultraviolet radiation through the gas in the chamber photodissociating the laser medium to initiate lasing activity, without substantial expansion of the plasma into the surrounding gas during such radiation.

19. A method of pumping a photolytic laser with a pair of spaced electrodes disposed within a chamber, said chamber confining a gas that upon ionization in a plasma radiates in the vacuum ultraviolet, said gas including a photolytic laser medium, said laser medium being photodissociable by vacuum ultraviolet radiation to produce particles having an upper laser state whence they undergo spontaneous transition to a lower laser state by laser action, said method comprising:

generating a laser beam and directing it along an elongated channel between the electrodes so as to excite gas particles within the chamber; and discharging electricity along the elongated channel so as to form a plasma pinch in the gas that radiates vacuum ultraviolet radiation through the gas in the chamber photodissociating the laser medium to initiate lasing activity without substantial expansion of the plasma into the surrounding gas during such radiation.

20. The method of claim 17, 18, or 19 further characterized in that electricity is discharged so as to form a stable plasma pinch.

21. The method of claim 17, 18, or 19 further characterized in that electricity is discharged so as to form a collapsing plasma pinch.

* * * * *